United States Patent [19]
Andrews et al.

[11] 3,747,984
[45] July 24, 1973

[54] PLASTIC WHEEL COVER

[75] Inventors: Eugene Walter Andrews, Livonia, Mich.; Donald Robert Klein, Greenville, Ohio

[73] Assignees: Sheller-Globe Corporation, Toledo, Ohio ; by said Klein; Ford Motor Company, Dearborn, Mich. ; by said Andrews

[22] Filed: Mar. 1, 1971

[21] Appl. No.: 120,024

[52] U.S. Cl. ............................................. 301/37 P
[51] Int. Cl. ............................................. B60b 7/00
[58] Field of Search ........................ 301/37 R, 37 P

[56] References Cited
UNITED STATES PATENTS

| | | | |
|---|---|---|---|
| 3,265,441 | 8/1966 | Baldwin | 301/37 P |
| 2,736,610 | 2/1956 | Waite | 301/37 P |
| 3,746,805 | 5/1956 | Gamundi | 301/37 R |
| 2,902,316 | 9/1959 | Black | 301/37 P |
| 3,397,921 | 8/1968 | Aske | 301/37 P |
| 3,252,738 | 5/1966 | Huntley | 301/37 P |

*Primary Examiner*—Richard J. Johnson
*Attorney*—John R. Faulkner and William E. Johnson

[57] ABSTRACT

A plastic wheel cover used for enclosing and decorating the central portion of a tire rim. The tire rim has an annular tire bead facing inwardly toward a central axis of the rim. The principal plastic portions of the wheel cover are formed in a single plastic molding operation. The wheel cover includes a decorative structure which covers the major portion of the tire rim. The cover also includes support structure which defines an annular continuation of the cover's decorative structure. The support structure provides an annular surface generally facing toward and in juxtaposition to the rim's tire bead. A plurality of retention fingers extend from the annular surface of the support structure along axes generally parallel to the central axis of the rim. The free ends of the retention fingers are received in the bead of the tire rim to retain the cover on the tire rim. The decorative structure, the support structure and the retention fingers are formed as a single unit in a plastic molding operation. Subsequent to the molding operation, the plastic wheel cover may be covered either wholly or partly with an electroplated coating to provide the wheel cover with an appearance that it is constructed either wholly or partly of metal.

7 Claims, 4 Drawing Figures

Patented July 24, 1973
3,747,984
2 Sheets-Sheet 1
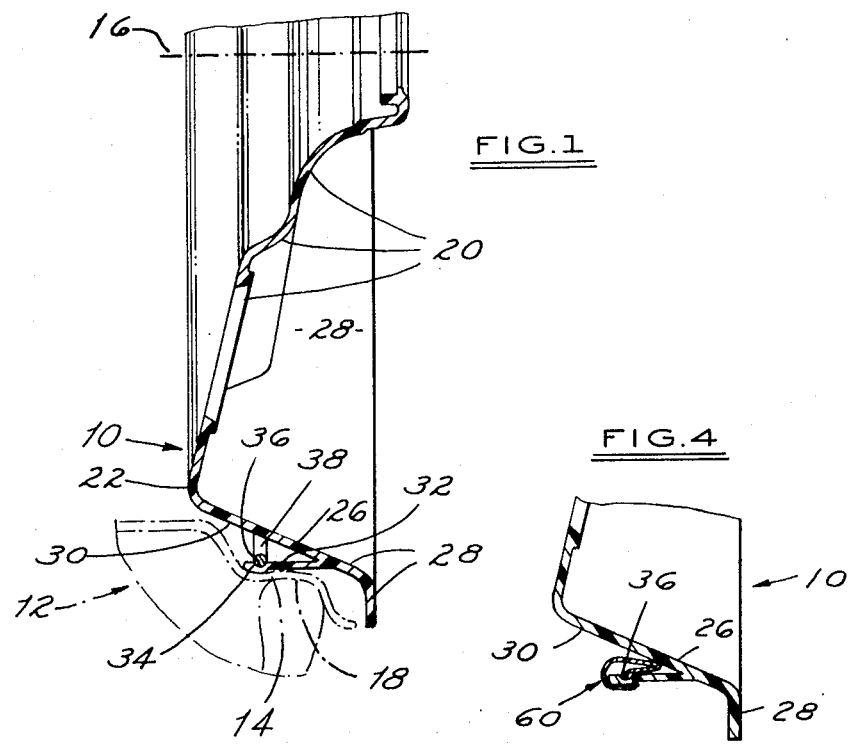
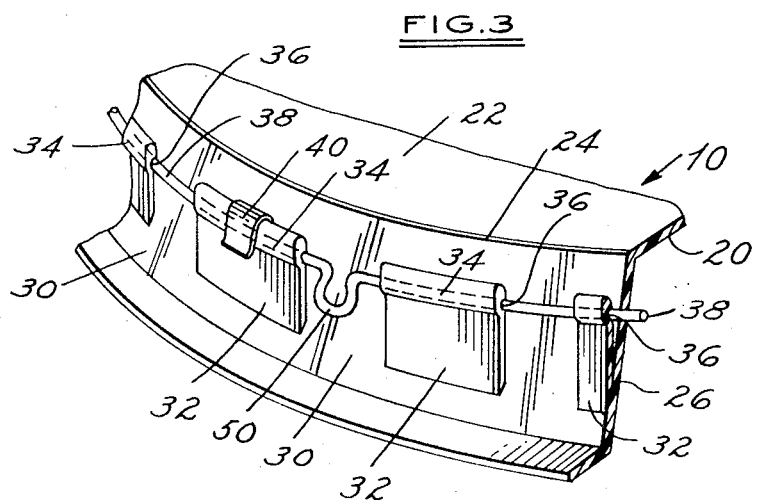
INVENTORS
EUGENE W. ANDREWS
DONALD R. KLEIN
BY John R. Faulkner
William E. Johnson
ATTORNEYS Patented July 24, 1973 3,747,984

INVENTORS
EUGENE W. ANDREWS
DONALD R. KLEIN

BY John R. Faulkner
William E. Johnson
ATTORNEYS

PLASTIC WHEEL COVER

BACKGROUND OF THE INVENTION

Various all metal constructions are known for wheel covers for use with tire rims of motor vehicles. In these all metal constructions, retaining clips or retaining fingers are either formed as an integral unit with the decorative portion of the cover or secured to the decorative portion of the cover in a metal bonding operation. These clips or fingers provide the cover with structure for retaining the cover on a tire rim.

Also known are wheel covers which are formed partially of plastic and partially of metal elements. Generally such dual material wheel covers are formed so that the metal elements thereof have portions which are embedded in the plastic. These covers are also formed so that the metal elements of the wheel cover form the structure utilized to retain the wheel cover on a vehicle tire rim.

In fabrication of a two material wheel cover, the metal element is generally placed in a mold cavity. The plastic for forming the other portions of the wheel cover is injected into the mold cavity to solidify around portions of the metal element and thereby form the final wheel cover. Portions of the metal element extend from the plastic to form the retaining structure for securing the wheel cover to a vehicle tire rim. The state of the prior art references is indicated by the following U.S. Pat. Nos. references which resulted from a preliminary search: 1,492,438; 2,102,471; 2,368,228; 2,812,215; 2,857,208; 2,898,152; 2,923,572; 2,970,009; 3,008,769; Re. 25,397; 3,178,231; 3,252,739; 3,333,900; 3,397,917; 3,397,920 and 3,397,921.

An all plastic wheel cover has many desirable characteristics over the above described wheel covers. A wheel cover of all plastic construction can be formed in a single molding operation without the necessity of inserting metal elements in the mold cavity prior to the molding operation. Also, the elimination of the metal elements of a wheel cover construction reduces the overall cost of the wheel cover. Another benefit of an all plastic wheel cover is its light weight as compared to standard metal covers. Still another benefit of an all plastic wheel cover is the ease with which complex and intricate designs may be molded in the decorative portion of the cover. Another advantage of an all plastic wheel cover is that the color of the plastic may be so chosen as to produce a wheel cover which wholly or partly matches the body color of the vehicle.

SUMMARY OF THE INVENTION

This invention relates to an all plastic wheel cover and, more particularly, to a wheel cover of which all the major components may be formed in a single plastic molding operation. Subsequent to the molding operation the plastic wheel cover may, if desired, be subjected to an electroplating operation to coat the wheel cover with an electroplated coating either in whole or in part.

in accordance with the teachings of this invention a cover for a vehicle wheel structure including a tire rim having an annular tire bead facing inwardly toward a central axis of the tire rim is formed in the following manner. The first major component of the wheel cover is a decorative structure which forms the major portion of the cover. This decorative structure is both located over the tire rim when the cover is in an installed position and has a central axis coaxial with the central axis of the tire rim. The decorative structure also has a peripheral edge located about its central axis. Support forming structure extends from the peripheral edge of the decorative structure to form an annular flange which is in facing relationship to the tire bead of the tire rim when the cover is in an installed position. A plurality of fingers, spaced about the circumference of the annular flange of the support structure, each extend lengthwise from the annular flange in a direction generally parallel to the central axis of the decorative structure of the cover. Retaining tips, formed at the free end of each of the fingers, are received in the tire bead of the tire rim to retain the cover on the rim. The decorative structure, the support structure, the plurality of fingers and the retaining tips form the major components of the wheel cover and they are all formed in a single plastic molding operation.

BRIEF DESCRIPTION OF THE DRAWINGS

FIG. 1 is a side elevation view, partly in cross section, of a wheel cover formed in accordance with the teachings of this invention.

FIG. 3 is a perspective view showing the retaining fingers projecting from the annular surface of the cover.

FIG. 4 is a partial, side elevation view, partly in cross section showing an auxiliary spring clip which may be used with the retaining fingers.

DESCRIPTION OF THE PREFERRED EMBODIMENT

Figure 2:
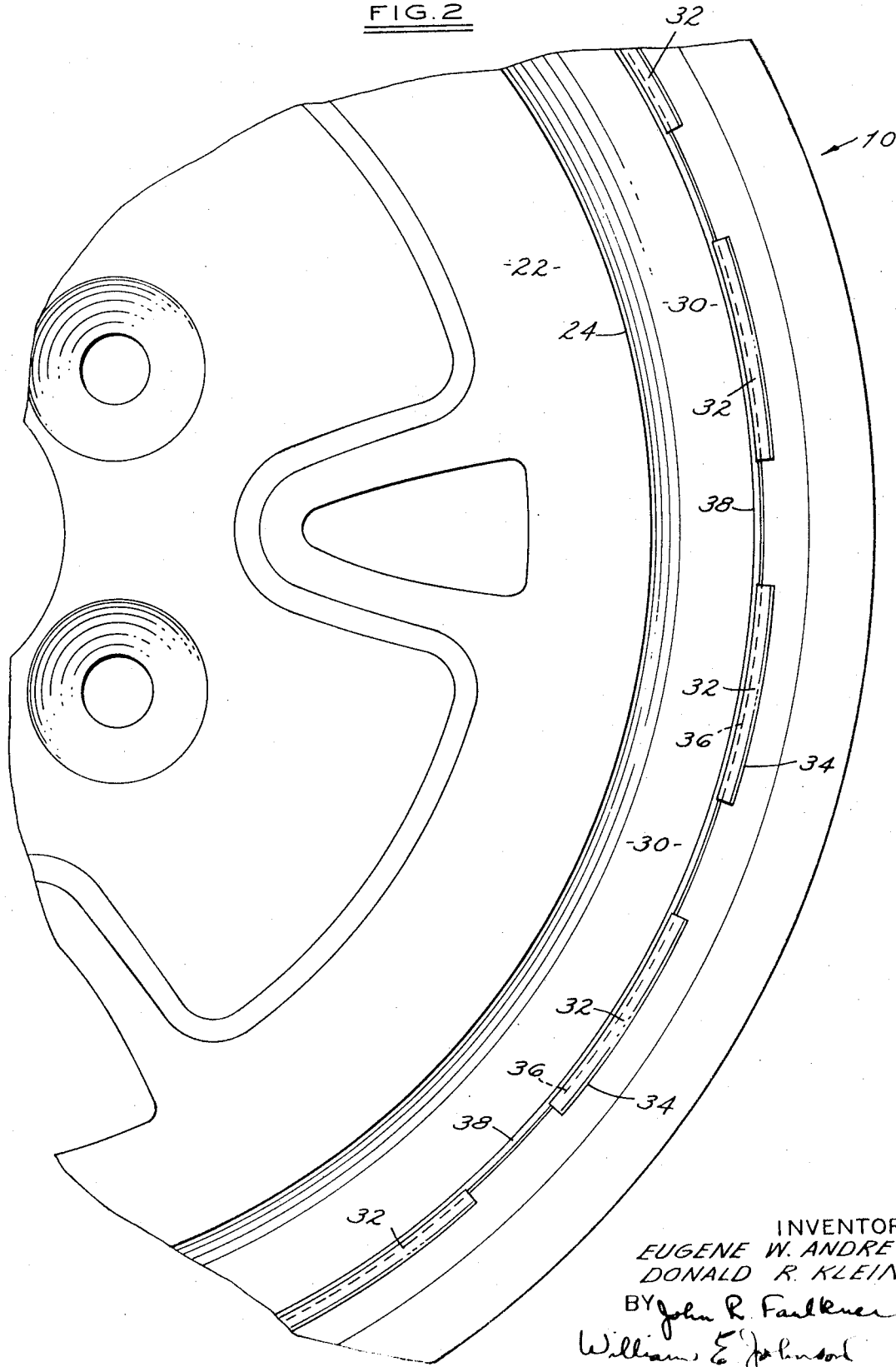
FIG. 2 is a partial, rear plan view of the wheel cover of FIG. 1 showing the location of a plurality of retaining fingers about an annular support surface of the cover.

In FIG. 1 there is shown a partial, side elevation view of a wheel cover, generally designated by the numeral 10, formed in accordance with the teachings of this invention. The wheel cover is used to cover decoratively a vehicle tire rim, generally designated by the numeral 12, shown in phantom in FIG. 1 only. Only the lower portion of the tire rim is shown. The tire rim has an annular tire bead 14 which extends about and faces inwardy toward a central axis 16 of the rim. A raised portion 18 is formed on the rim just ahead of the tire bead. The provision of an annular tire bead and a raised portion are standard on the tire rims now produced for motor vehicle use.

In general, the wheel cover 10 has all of its major components formed in a single plastic molding operation. One of these major components is a decorative structure 20, best seen in FIG. 1, for covering the major portion of the central opening in the tire rim. The decorative structure 20 may be formed to any desirable configuration so as to produce an aesthetic effect for the wheel cover. Also, the color of the plastic utilized for the molding operation may be so selected that the cover has the same color as the color employed for the major sheet metal body components of the motor vehicle.

The coloring of the plastic may be carried out either by painting the plastic wheel cover after it is molded or by inserting the coloring material into the plastic prior to the molding operation. Preferably the color is applied to the plastic either wholly or in part (through use of masking) by applying or painting any suitable paint material on to the plastic wheel cover after it has been molded. If the wheel cover is electroplated subsequent to the molding operation, a color or paint coating may still be applied to portions of the plastic which were masked off from the electroplating operation. In order to mask off certain portions of the plastic wheel wheel covers during the electroplating operation, it is only necessary, for example, to apply a stop-off coating to the areas of the wheel cover which are not desired to be electroplated.

The decorative structure 20 has a central axis coaxial with the central axis 16 of the tire rim 12 when the wheel cover 10 is in an installed position as shown in FIG. 1. Also, as may best be seen by viewing FIG. 3, a rear surface 22 of the decorative structure has a peripheral edge 24 located about the central axis of the decorative structure. A support structure 26 extends from the peripheral edge 24 outwardly toward the front of the tire rim as viewed in FIG. 1. The support structure 26 has a decorative face 28 which is seen only in FIG. 1. The decorative face 28, in conjunction with the decorative structure 20, forms the portion of the wheel cover which is exposed for view when the wheel cover is in an installed position.

The support structure 26 also has an inwardly facing surface 30 which defines an annular surface at an angle to the central axis 16 of the tire rim when the wheel cover 10 is in an installed position. This annular surface generally faces towards and is in juxtaposition to the tire bead 14 along the entire circumferential extent of the tire bead. The angular attitude of the inward facing surface 30 with respect to the central axis of the tire rim is of importance in forming the plastic wheel cover 10.

A plurality of retention fingers 32, sixteen in the preferred embodiment shown in the drawings, extends in their length dimension from the inward facing surface 30 of the support structure 26. These fingers are formed in the same plastic molding operation which forms the decorative structure 20 and the support structure. In their length dimension, the plurality of fingers project from the inward facing annular surface 30 in directions generally parallel to the central axis of the decorative structure 20. This may best be seen by viewing FIG. 2. Gripping surfaces 34, shown best in FIGS. 1 and 3, are formed on the free ends of the retention fingers 32. These gripping surfaces are formed so that the portion thereof engaging the tire bead 14 of the tire rim 12, as shown in FIG. 1, have a plurality of serrations or grooves thereon so that they are retained in the tire bead.

Since the retention fingers 32 are formed from plastic and since their thickness dimension is small, the fingers may flex slightly when the wheel cover is installed on the tire rim 12 thereby permitting the gripping surfaces 34 thereon to pass up over the raised portion 18 of the tire rim. In the width dimension, each of the retention fingers, and their associated gripping surfaces, extend along an arcuate portion of the annular inward facing surface 30 of the support structure 26 as is best seen in FIG. 2.

The wheel cover 10, as described to this point, can be formed in a single plastic molding operation. More particularly, the wheel cover may be molded in a mold cavity so that its decorative structure 20, its support structure 26, its retention fingers 32 and gripping surface 34 are formed simultaneously in a single plastic molding operation. The wheel cover, as described to this point, needs no supplemental or additional structure to aid in its installation and utilization in conjunction with a tire rim of a motor vehicle.

However, in heavy duty use, such as where the wheel cover is intended for use on a vehicle which is exposed to and utilized over rough terrain or roads, an additional reinforcing or spring force may be employed. This additional spring force insures the retention of the retention fingers 32 in the tire bead 14 of a tire rim 12 after the cover has been installed. One manner of accomplishing the addition of the increased spring force is by providing a channel 36 in the free end of each of the extending fingers 32 right behind the gripping surfaces 34 formed on the fingers. Received within the channels of each of the fingers is a portion of a circular wire spring 38. The wire spring extends around the complete circumference of the wheel cover and engages all of the free ends of the retention fingers 32. As shown in FIG. 3, an additional clip 40 may be employed to retain the wire spring 38 in its proper association with the extending fingers 32.

There is also shown in FIG. 3 an expansion loop 50 formed in the wire spring 38. It is preferred that at least one or more of such expansion loops 50 should be formed in the wire spring in order to facilitate compression and subsequent engagement during positioning of the wheel cover on the rim of the tire.

FIG. 4 shows an alternative type of spring clip designated 60. The spring clip 60 may be used either as an auxiliary retention device in place of the wire spring 38, or it may be used in conjunction with the wire spring 38. Generally if a spring clip such as element 60 is used, it should be installed near a center position on finger 32 (in a fashion similar to the mounting of clip 40 in FIG. 3) and normally a minimum of about six of the spring clips 60 are required per wheel cover assembly. The style of spring clip 60 is designed to overcome or compensate for creep or permanent shrink (across the diameter dimension thereof) which may sometimes occur in a plastic wheel cover.

It has furthermore been found in accordance with this invention that an electroplated coating applied to the wheel cover such that the plastic fingers 32 thereof are covered with an electroplated layer substantially assists in the avoiding of creeping or improper setting of the molded plastic fingers, for example as might occur in some instances during very cold or inclement weather. Electroplating to prevent this type of creeping in the plastic may be utilized either alone or in conjunction with the reinforcement provided with the wire spring 38.

The invention disclosed will have many modifications which will be apparent to those skilled in the art in view of the teachings of this specification. It is intended that all modifications which fall within the true spirit and scope of this invention be included within the scope of the appended claims.

What we claim is:

1. In a vehicle wheel structure including a tire rim having an annular tire bead facing inwardly toward a central axis of the tire rim, a cover for the outer side of the wheel which comprises:

first structure means for forming the major portion of said cover located over said tire rim, said first structure means having a central axis coaxial with said central axis of said tire rim when said cover is in its installed position, said first structure means also having a peripheral edge located about its central axis;

second structure means extending from said peripheral edge of said first structure means for forming a flange having at least an annular surface portion at an angle to said central axis of said first structure means; and a plurality of retention finger means having free ends for engaging said annular tire bead of said tire rim, said finger means being formed on and projecting from said annular surface portion in directions generally parallel to said central axis of said first structure means, said free ends of said finger means being spaced about said annular surface portion of said second structure means, said plurality of retention finger means having an electroplated layer of material thereon;

said first structure means; said second structure means and said plurality of retention finger means being formed as a unitary plastic article in a single plastic molding operation.

2. The cover for enclosing and decorating the central portion of a tire rim as defined in claim 1 further including: spring means acting on each of said retention finger means to bias them into engagement with said tire bead of said tire rim.

3. In a vehicle wheel structure including a tire rim having an annular tire bead facing inwardly toward the central axis of the tire rim, a cover formed as an integral unit in a plastic molding operation for the outer side of the wheel comprising:

first structure means for forming the major portion of said cover located over said tire rim, said first structure means having (a) a central axis coaxial with said central axis of said tire rim in an installed position, (b) a decorative surface facing away from said tire rim when in an installed position, and (c) a peripheral edge;

a second structure means extending from said peripheral edge of said first structure means for forming a secondary portion of said cover having (a) a decorative surface facing away from said tire rim when in an installed position, and (b) an inwardly facing flange having at least an annular surface portion at an angle to said central axis of said first structure means;

a plurality of fingers having an electroplated layer of material thereon projecting from said annular surface in directions generally parallel to said central axis of said first structure means, said fingers extending along an arcuate portion of and being spaced equally about said annular surface and having free ends; and gripping surfaces formed on said free ends of each of said plurality of projecting fingers, said gripping surfaces having inwardly facing ridges thereon and being complementary in shape to said tire bead of said rim and being received therein to secure said cover to said rim, each of said fingers being sufficiently flexible to permit flexing of said free ends thereof so that said gripping surfaces thereon may move into said tire bead;

said first structure means, said second structure means, said plurality of projecting fingers and said gripping surfaces being formed as a unitary plastic article in a single plastic molding operation.

4. The wheel cover of claim 3 wherein: said free end of each said plurality of projecting fingers has a channel formed on the surface thereof away from its said gripping surface, and wherein a portion of a circular wire spring is received in said channel of each of said projecting fingers to enhance the resiliency of said fingers.

5. The cover for enclosing and decorating the central portion of a tire rim as defined in claim 3 further including: spring means acting on each of said plurality of fingers to bias them into engagement with said tire bead of said tire rim.

6. A cover for enclosing and decorating the central portion of a tire rim, the tire rim having an annular tire bead therein which faces inwardly toward a central axis of the rim, the cover comprising:

first means for defining a major portion of said cover overlying said tire rim;

second means defining an annular continuation of said first means for providing an annular surface generally facing towards and in juxtaposition to said tire bead of said tire rim when said cover is in operative association with said tire rim, said annular surface being at an angle to said central axis of said tire rim, and retention finger means having an electroplated layer of material thereon for extending from said annular surface along axes generally parallel to said central axis of said tire rim to a position wherein a free end of each of said finger means is received in said tire bead to retain said cover on said rim, said first means, said second means and said retention finger means being formed as a single unit of a plastic material in a plastic molding operation.

7. The cover for enclosing and decorating the central portion of a tire rim as defined in claim 16 further including: spring means acting on each of said retention finger means to bias them into engagement with said tire bead of said tire rim.

* * * * *